United States Patent [19]

Nay

[11] Patent Number: 4,897,783

[45] Date of Patent: Jan. 30, 1990

[54] COMPUTER MEMORY SYSTEM

[76] Inventor: Daniel L. Nay, 30147 Via Borica, Palos Verdes, Calif. 90274

[21] Appl. No.: 879,465

[22] Filed: Jun. 27, 1986

Related U.S. Application Data

[63] Continuation of Ser. No. 474,831, Mar. 14, 1983.

[51] Int. Cl.[4] .................................... G06F 12/08

[52] U.S. Cl. .................................... 364/200; 364/243.41; 364/243.4; 364/243

[58] Field of Search ... 364/200 MS File, 900 MS File

[56] References Cited

U.S. PATENT DOCUMENTS

| | | | |
|---|---|---|---|
| 3,569,938 | 3/1971 | Eden et al. | 364/200 |
| 3,949,369 | 4/1976 | Churchill, Jr. | 364/200 |
| 4,264,953 | 4/1981 | Douglas et al. | 364/200 |
| 4,315,312 | 2/1982 | Schmidt | 364/200 |
| 4,322,795 | 3/1982 | Lange et al. | 364/200 |
| 4,322,815 | 3/1982 | Broughton | 364/900 |
| 4,370,710 | 1/1983 | Kroft | 364/200 |
| 4,458,310 | 7/1984 | Chang | 364/200 |
| 4,490,782 | 12/1984 | Dixon et al. | 364/200 |
| 4,493,026 | 1/1985 | Olnowich | 364/200 |
| 4,506,323 | 3/1985 | Pusic et al. | 364/200 |

*Primary Examiner*—Eddie P. Chan
*Assistant Examiner*—Kevin A. Kriess
*Attorney, Agent, or Firm*—Keith D. Beecher

[57] ABSTRACT

A computer memory system which includes a relatively slow access main memory unit and a relatively fast access smaller cache memory unit, the memory units being controlled by a central processing unit, and which further includes control circuitry for accessing the cache memory unit for all data words addressed by the central processing unit, and when an addressed word is not available in the cache memory, automatically transferring the addressed word from the main memory to the cache memory, the control being such that when such an addressed word is transferred from the main memory to the cache memory, adjacent words in the main memory are simultaneously transferred to the cache memory to be readily available to the central processor unit.

6 Claims, 7 Drawing Sheets

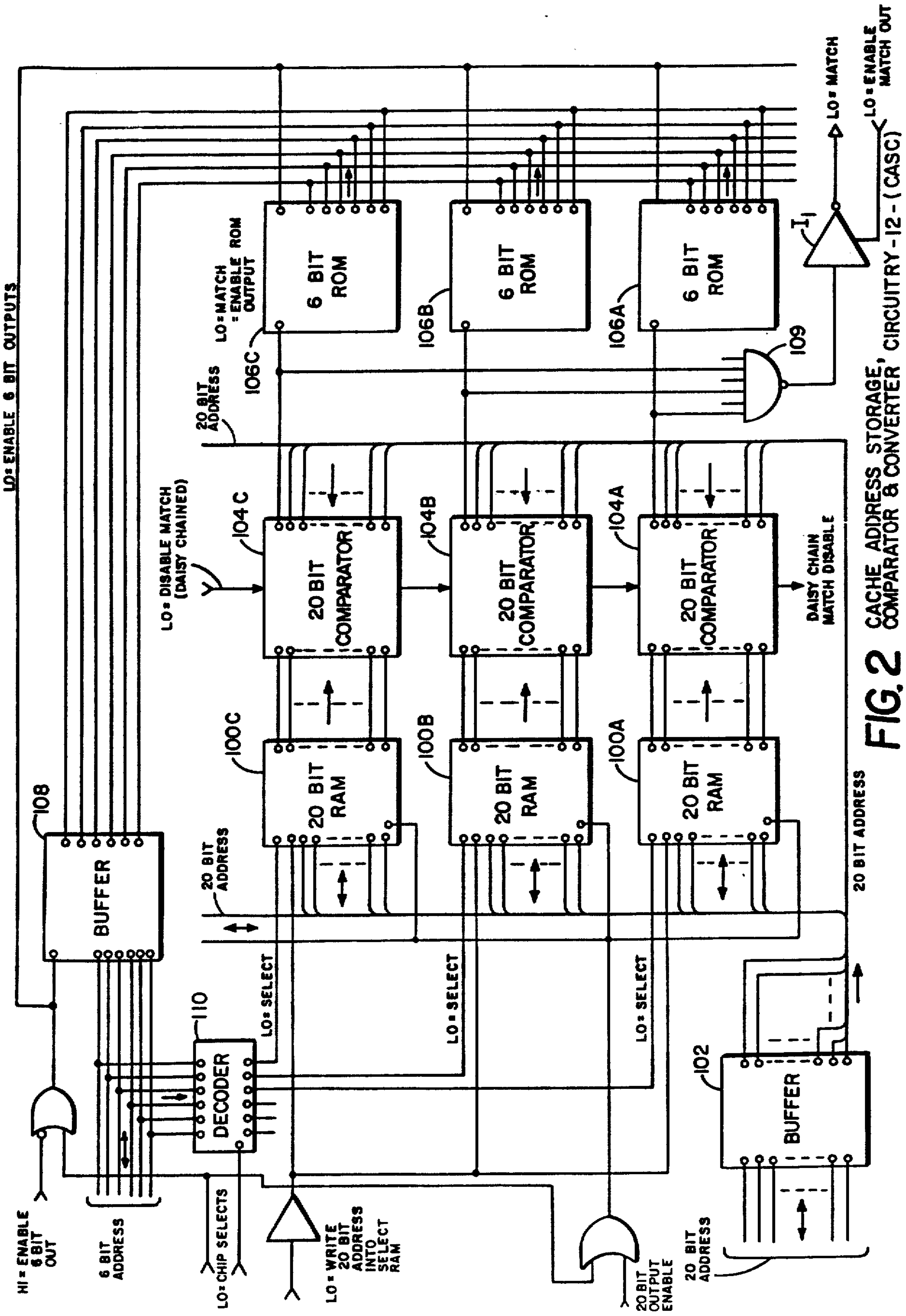
FIG. 2 CACHE ADDRESS STORAGE, COMPARATOR & CONVERTER CIRCUITRY-12-(CASC)

CACH ADDRESS STATUS STORAGE & CONVERTER CIRCUITRY-14-
(CASSAC)

MEMORY ACCESS CACHE CONTROL CIRCUITRY (MAC) -10-
MASTER CONTROL

COMPUTER MEMORY SYSTEM

This application is a continuation of Copending application Ser. No. 474,831, filed Mar. 14, 1983.

BACKGROUND OF THE INVENTION

A present-day computer is made up of three primary sections. These sections comprise a central processing unit which processes the data through the computer, a memory unit which stores the data and which also stores the program for the central processing unit, and an input/output unit through which the data and a number of control signals pass.

Originally, the memory unit was a uniform array of storage devices which retained a multiplicity of binary 1's and 0's which made up the program and data. The present-day computer, however, usually has several types of memory units. For example, there are two major categories of computer memory.

The first major category is the main memory, which is usually composed of random access memory units (RAMs), read only memory units (ROMs), programmable read only memory units (PROMs), and the like. The central processing unit (CPU) can access the main memory several million times per second, with each access being anywhere from a single binary bit, up to 64 bits, or more. The total volume of the main memory in present-day computers extends from a few hundred bytes to several million bytes.

The second major category of the present-day computer memory is referred to as the mass storage unit. This unit is usually composed of one or more disc drives, but it may also include magnetic tapes, cassettes, floppy discs, drums, cartridges, paper tape, and the like. In any case, access to the mass storage unit is through the input/output section of the computer, and always takes much longer than access to the main memory. For example, a typical disc access might require 30 milliseconds, and a tape access might require several seconds. Also, mass storage access usually involves the transfer of hundreds of bits. Total volume of a mass memory system is usually from several hundred thousand bytes to several thousand million bytes.

Obviously, the potential of any computer is a function of its memory size. Accordingly, memory sizes are constantly being enlarged, and the designs for both main memory and mass memory components are presently advancing rapidly in the art. Likewise, the faster the central processing unit can access the memory the greater the potential power which is available. A major portion of recent development efforts has gone into increasing the speed of the central processing unit, and also into increasing the memory access speed, because a fast central processing unit is ineffective without a fast access to its memory.

Presently, there are memory units which meet nearly every individual requirement needed to optimize computer operation. The ideal memory unit contains a large number of bytes, and it is accessible in a small number of nanoseconds. Moreover, it is also inexpensive. There are inexpensive memory units presently available on the market that meet the individual requirements of size and accessibility, but none which combines both of them. Thus, compromises have been necessary in the prior art, and if one desired a large, fast memory array, then fast expensive units must be used. On the other hand, if a person desires an inexpensive, large memory, inexpensive units are available which may contain many bytes, but which have slower access speeds.

Over the years, due to the factors enumerated above, various techniques have been used to make the main memory appear to have faster access time. This has been accomplished in some prior art systems by the introduction of a small, fast access memory array (known as the "cache" memory) which is placed between the central processing unit and the main memory array. In such a system, each time the central processing unit accesses a word in the fast memory, it reduces the average memory access time. On the other hand, each time the central processing unit in the prior art system accesses a word in the main memory, it increases the average memory access time.

Accordingly, it has become essential to devise a system in which most accesses are made from the cache memory, rather than from the main memory. Different approaches have been used in the past in attempts to improve the ratio of average number of accesses to the cache memory to average number of accesses to the main memory. However, the prior art approach has been to rely upon the natural characteristics of some computer programs which tend to access the same word repeatedly. In the prior art systems, when a word is selected by the central processing unit from the main memory, that word is transferred to the cache memory, so that each subsequent selection of that word will be from the cache memory.

An important objective of the present invention is to provide a memory system which includes a small fast access cache memory interposed between the central processing unit and the main memory, and which is constructed so that the ratio of the average number of accesses to the cache memory as compared with the average number of accesses to the main memory is substantially improved over the prior art systems of the same general type.

As explained above, many computer programs will access the same word several times, and that fact has been used in the prior art in attempts to increase the overall apparent access speed of the computer. Unfortunately, some computer programs access most words only once, and the prior art systems are not effective with such programs. However, all computer programs are primarily sequential. That is, when a program word or data word is accessed, the probability is very high that the next higher or lower word in the main memory will be accessed next. For example, a sub-routine may be fifty bytes long, but it is stored together, in contiguous locations in the main memory. Similarly, a typical data record, such as a customer's account file, which may be two thousand bytes long, is also stored in a selected area of the main memory in contiguous locations.

In accordance with the concepts of the present invention, when the central processing unit accesses the first word of a sub-routine or data block from the main memory, not only is that word transferred to the cache memory, but the contiguous words in the main memory are also simultaneously transferred to the cache memory. This results in many future accesses by the central processing unit being achieved from the cache memory instead of from the main memory, which guarantees a very high ratio of fast accesses as compared with slow accesses.

To implement the function described in the preceding paragraph, a parallel connection between the main memory and the cache memory is required. For example, a 64-byte wide connection (512 bit lines) might be provided. Accordingly, every time the central processing unit has to access a word from the main memory, an entire block of 64 bytes, for example, containing that word and other contiguous words, is simultaneously transferred from the main memory into the cache memory. Subsequently, whenever the central processing unit desires to access a word adjacent to the previously accessed word, the new word may be accessed from the cache memory. Therefore, one slow access of many bytes assures many fast subsequent accesses of those bytes.

Specifically, the system of the invention provides for the simultaneous parallel transfer of words from the main memory to a cache memory. This transfer exceeds the central processing unit's immediate requirements in anticipation of the probability of future requirements of the central processing unit. This technique provides an instant improvement in the apparent access time to the main memory. Typically, only one out of thirty-sixty accesses are made from the main memory. However, even if the average were only one out of ten, the improvement over the previous systems would be significant. An advantage of the system of the invention is that no special software modifications are required, since any software will work due to the principle of "Locality of Reference".

In order to implement the simultaneous parallel transfer of a block of words from the main memory to the cache memory efficiently, special control circuitry is required, which will be described in detail. This control circuitry will be referred to as the "cache address storage and comparator" (CASC) circuitry. That is, every time the central processing unit desires to access memory, this control circuitry must determine whether the access can be made from the cache memory, or whether it must be made from the main memory. Every time the central processing unit desires to read or write from memory, it places an address on the address bus corresponding to the word location in the main memory. However, the word location address in the cache memory is totally different, and the control circuitry must have access to the block addresses of all blocks stored in the cache memory, and it must quickly determine if the word in the main memory address requested by the central processing unit is in the cache memory.

If the word requested by the central processing unit is indeed in the cache memory, then control circuitry quickly convert the main memory address requested by the central processing unit to the corresponding cache memory address. For example, the main memory may contain byte addresses from 0 to 7FFFF (hexadecimal notation); and the cache memory addresses may only extend from 0 to 0FFF. Thus, a conversion of the 19-bit central processing unit main memory address request to a 12-bit cache memory address must occur in the control circuitry automatically and rapidly. Typically, the low order bits (4 to 10 bits) would be identical insofar as addressing both memories is concerned, so that only the higher-order bits need be converted.

If the word requested by the central processing unit is not contained in the cache memory, then the following series of actions by the control circuitry occur: The central processing unit is signalled that the access will be to main memory, this being achieved by transmitting a "wait" command to the central processing unit; the block location in the cache memory is selected in which to place the new block from main memory, corresponding to the accessed word and a predetermined number of adjacent words; the block containing the desired word and its adjacent words is transferred by simultaneous transfer from the main memory to the cache memory; the main memory address of the block now in cache memory is stored in the control circuitry; the central processing unit is given access to the desired word which is now in the cache memory; and the central processing unit is signalled that the word is now available, by releasing the "wait" command.

When a new block is to be transferred into the cache memory, but the cache memory is already full, one of the blocks in the cache memory must be deleted by being overwritten with the new block from the main memory. The system of the invention also contains special circuitry to accomplish a reasonably efficient algorithm to select the block in the cache memory which is to eliminated. This special control circuitry is premised on the concept that a block status message is stored in the special circuitry corresponding to each block in the cache memory, and the status of the various messages stored in the special circuitry is adjusted periodically according to different algorithms which may be selected.

Then, when a decision to eliminate a particular block from the cache memory must be made, the special circuitry performs a high-speed scan of all the status messages in the special circuitry using simultaneous comparisons, and selects one which best meets the selected criteria. The system then transfers the block from the main memory to the particular block address within the cache memory corresponding to the block to be eliminated.

Thus, the special circuitry serves to store the status of the various blocks in the cache memory, periodically to up-date the status, to perform the high-speed scan of all the stored status, and then to convert the status to a particular address in the cache memory, corresponding to the block in that memory which is to be eliminated. This special circuitry will be referred to hereafter as the "cache address status storage and converter" (CASSAC) circuitry.

BRIEF DESCRIPTION OF THE DRAWINGS

FIG. 2 is a logic diagram of one of the components of the system of FIG. 1, namely a cache address storage, comparator and converter circuit (CASC);

DETAILED DESCRIPTION OF THE ILLUSTRATED EMBODIMENT

Figure 1:
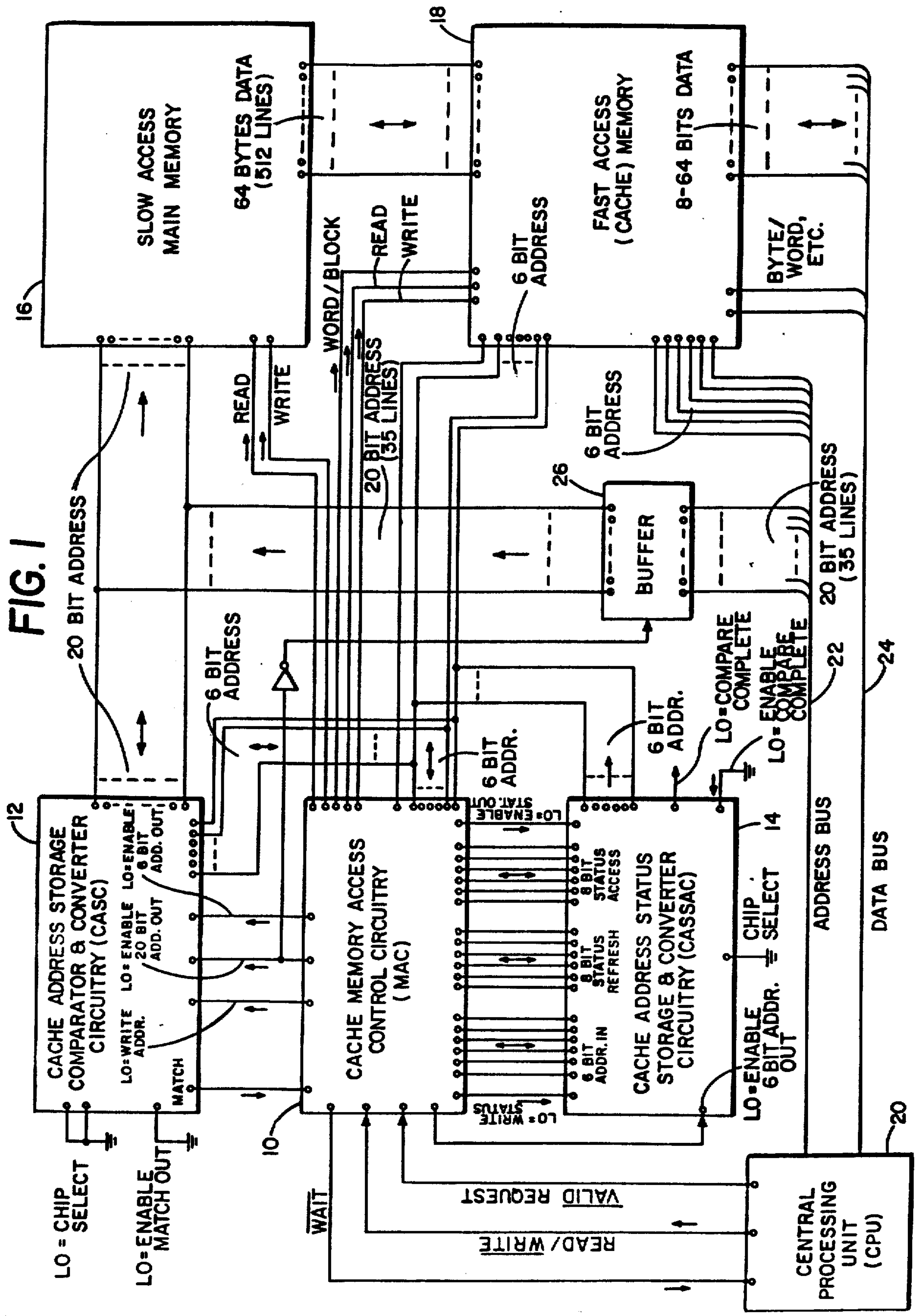
FIG. 1 a block diagram of one embodiment of the computer memory system of the invention.
Figure 1A:
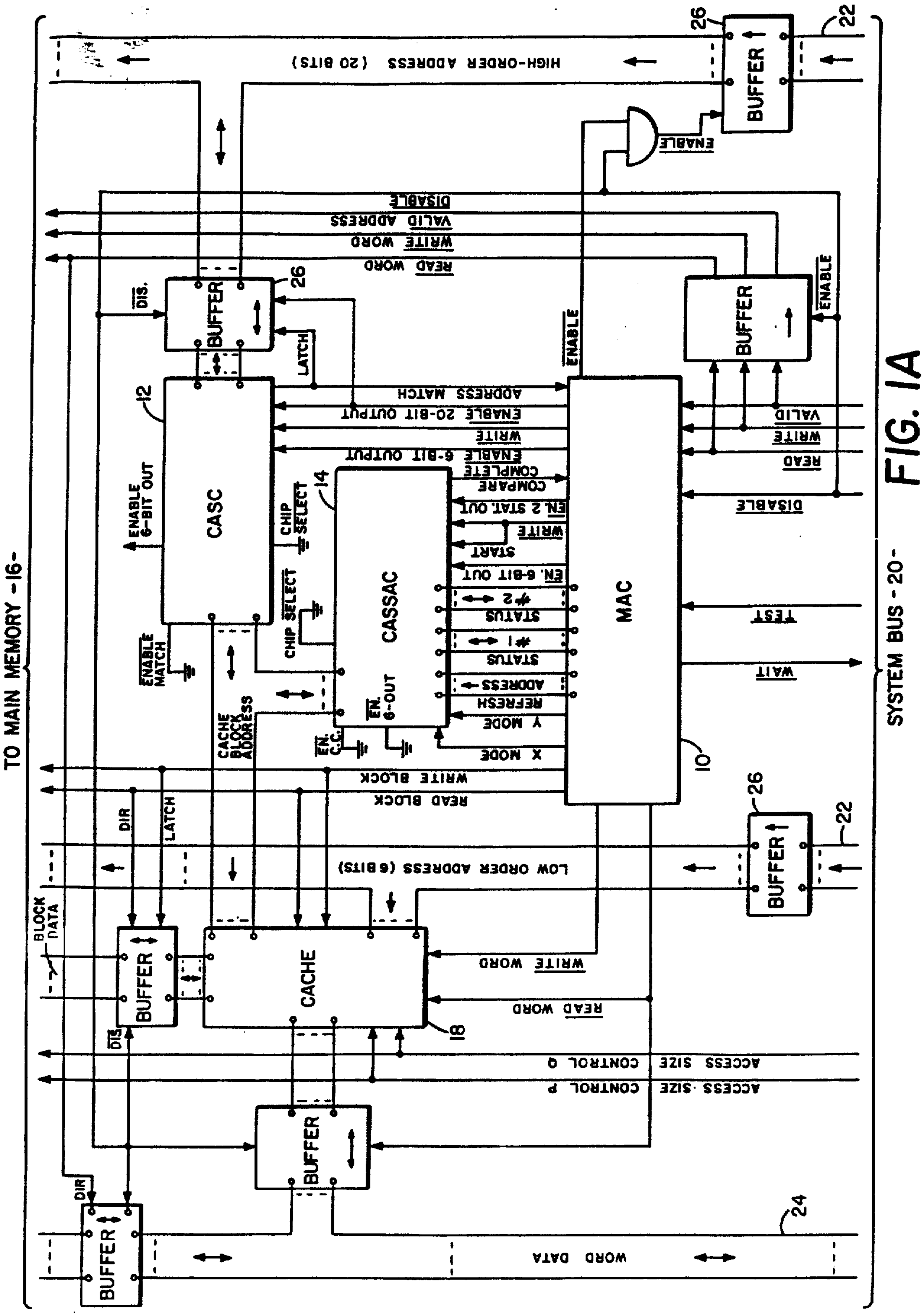
FIG. 1A is a somewhat more detailed block diagram of the embodiment of FIG. 1.

The computer memory system shown in FIGS. 1 and 1A includes cache memory access control circuitry (MAC) designated 10; cache address storage comparator and converter circuitry (CASC) 12; and cache address status storage and converter circuitry (CASSAC)

14. The memory system also includes a slow access main memory 16 and a fast access cache memory 18.

The memory system is under the control of a usual central processing unit (CPU) 20 which includes an address bus 22 and a data bus 24, both of which may be combined into a single bus in accordance with present-day practice.

The address bus supplies 20-bit address signals to a buffer 26, which signals are used to address the main memory 16 and the CASC circuit 12. The address bus 22 also supplies 6-bit address signals to the cache memory 18, which also receives 6-bit address signals from the CASC circuit 12.

The main memory 16 provides 64 bytes of data to the cache memory 18 along parallel paths; and 8 to 64 bits of data flow between the data bus 24 and cache memory 18.

The cache memory 18 also receives 6-bit address signals from the CASSAC 14. In addition, 6-bit "refresh address" signals are supplied by the control circuit 10 to the CASSAC circuit 14; and 8-bit "refresh status" and "current access" signals flow between the control circuit 10 and the CASSAC circuit 14.

The central processing unit 20 supplies a read/$\overline{\text{write}}$ signal to the control circuit 10, and a $\overline{\text{valid request}}$ signal to the control circuit. The control circuit supplies a $\overline{\text{wait}}$ signal back to the central processing unit.

As described above, in order for the memory system of FIGS. 1 and 1A to be effective, it is necessary for the central processing unit 20 to access the main memory 16 in a significantly sequential manner. That is, if the access is totally random, whereby one word is accessed at one location in the main memory, with the probability that the next word will be anywhere in the memory, then the access time will not be improved by the system of the invention. However, as previously noted, most central processing units access memory in a sequential manner with occasional jumps and calls to other locations. The system of the invention significantly improves the access time for this latter type of system. The key ingredient is that many accesses to memory are grouped into areas of a few hundred bytes.

The main memory 16 may be almost any configuration, preferably uniform, and it may have a slow access of, for instance, 150 nS access time, with 300 nS cycle time. As will be described, the cache memory 18 includes a number of fast random access memories (RAM's) and it is located between the main memory 16 and the central processing unit 20. The cache memory must be faster than the desired average access time. For example, if 50 nS average access time is desired, then the cache memory must be of the order of 40 nS depending upon the specific memory configuration.

The central processing unit 20 must be capable of waiting for a long access occasionally. For example, if each access is 20 nS, periodically an access might require 160 nS. When the longer access is necessary, the control unit 10 signals the central processing unit 20 to wait until the memory is ready for the next access.

The central processing unit 20 accesses the cache memory 18 exactly as if it were a large fast memory, except that occasionally the control circuit 10 causes the central processing unit 20 to wait for an access to the main memory 16. The connection between the relatively large main memory 16 and the smaller cache memory 18 is the 512 lines illustrated in FIGS. 1 and 1A which provide basically a simultaneously parallel transfer bus between the two memory sections. Therefore, even though the central processing unit 20 may require a word of one-eight bytes from the cache memory 18, all transfers between the main memory 16 and the cache memory are entire blocks containing a number of words.

The CASC circuit 12 compares each address request from the central processing unit 20 with the main memory address of information stored in the cache memory 18. If the requested word is available from the cache memory 18, the central processing unit 20 is given immediate access. If the particular word is not available from the cache memory 18, the central processing unit 20 is commanded by the control circuit 10 to wait until the desired word is transferred from the main memory 16 to the cache memory 18, along with a number of additional contiguous words. When the simultaneous parallel transfer between the main memory 16 and the cache memory 18 has been completed, the control circuit 10 removes the wait signal from the central processing unit, and the central processing unit is given access to the desired word which is now in the cache memory 18.

As mentioned above, the cache address storage, comparator and converter circuit (CASC) is shown in logic detail in FIG. 2. This circuit includes a plurality of RAMs designated 100A, 100B, 100C in FIG. 2, although more or less may be used as desired. The RAMs store addresses from the central processing unit 20 of FIG. 1 via the address bus, which supplies 20-bit address signals to a buffer 102. The address signals from the buffer 102 are also introduced to a series of 20-bit comparators 104A, 104B and 104C, respectively coupled to the RAMs. Again, more or less comparators may be used, depending upon the number of RAMs. The CASC circuit also includes a corresponding number of read-only memories (ROMs) designated 106A, 106B, 106C. The ROMs introduce their 6-bit outputs to a buffer 108.

A CHIP SELECT signal determines whether the 6-bit address output from buffer 108 is to be introduced to the cache circuit 18 of FIG. 1; or whether a 6-bit address signal from CASSAC circuit 14 is to be introduced to a 6-line to 64-line decoder 110. The latter address signal causes the decoder 110 to determine which of the RAMs 100A, 100B and 100C is to be selected. If a match is achieved by any comparator 104A, 104B, 104C of input 20 bit address and the address stored in any RAM, a corresponding ROM 106A, 106B, 106C is selected, and its 6 bit cache address output is introduced to buffer 108. After one of the RAMs has been selected, the selected RAM is provided data from buffer 102 when the write signal is low, or the selected RAM provides data to the buffer if the write signal is high.

Whenever a match is achieved in any of the comparators, the circuit of FIG. 2 provides a match output signal, when inverter I1 is enabled by a MATCH OUT command signal. As mentioned above, the CASC circuitry of FIG. 2 stores main memory addresses of data presently residing in the cache memory 18, and it simultaneously compares all the stored addresses against a desired address and, if a match is made, it converts the main memory address into the corresponding cache address;

The main memory address corresponding to each block which is introduced into the cache memory is written into one of the RAMs 100A, 100B, 100C. The location of the main memory address within the CASC circuitry is exactly the same as its location in the cache memory. That is, for example, the tenth block of data in the cache memory has its main memory address stored in the tenth RAM location in the CASC circuitry, and so on.

With all of the addresses of data blocks in the cache memory being stored in the CASC circuit, and by the use of an individual comparator, such as comparators 104A, 104B, 104C for each address, the new desired address can be simultaneously compared with all the stored addresses on an almost instantaneous basis. If a match occurs, the output from the particular comparator enables a corresponding output from one of the ROMs 106A, 106B, 106C, etc., to send the cache address corresponding to the stored main memory address to buffer 10B. Since the location in the CASC circuitry and in the cache memory are numerically the same, the CASC output is merely the CASC channel number. That is, the RAM location number in the CASC circuitry. An advantage of the CASC circuitry over prior art cache directories is that the match detection and address conversion is instantaneous, since no memory accesses are involved,.and all conversions are in parallel and are therefore simultaneous.

A typical CASC circuit may contain, for example, sixty-four identical channels, each containing a 20-bit static RAM, such as the RAMs 100A, 100B, 100C, etc.; a 20-bit comparator, such as comparators 104A, 104B, 104C, etc.; and a 6-bit ROM, such as ROMs 106A, 106B, 106C. Each ROM has an output buffer enabled by the output of a corresponding comparator. Each RAM has two outputs, one goes to the corresponding comparator, and the other is applied to buffer 102 in which it is tri-stated, except when that particular RAM is selected by a 20-bit READ operation. The RAM contents can be written from an external address if the channel is selected for a 20-bit WRITE operation.

In addition to the sixty-four identical RAM/comparator/ROM channels, the CASC circuitry contains the 6-line to 64-line decoder 110, referred to above. This decoder allows a 6-bit input address to select one of the sixty-four channels for READ or WRITE. Only one of the sixty-four channels is selected at any one time. The write control line is buffered and then taken to each of the sixty-four RAMs for WRITE operations. An OUTPUT ENABLE command is buffered and then introduced to each of the sixty-four RAMs for READ operations. Any given RAM will not respond to either the WRITE command or to the OUTPUT ENABLE command unless it is specifically selected by decoder 110.

Bidirectional buffer 102 separates the external 20-bit address from the internal 20-bit bus. This buffer normally transmits external data into the CASC circuitry, unless both the CASC CHIP-SELECT command is activated and also the 20-bit OUTPUT ENABLE is activated.

The 6-bit external address enters the CASC circuitry to control the decoder 110. The same 6-bits can also be the channel address output from the ROMs. Tri-state buffer 108 separates the 6-bit input/output lines and decoder from the 6-bit bus connecting the ROMs. The output of this buffer is only enabled if both the 6-bit OUTPUT ENABLE lines are activated.

Finally, a sixty-four input gate 109 detects when any one of the comparators report a match. The gate output is TRI-STATED unless the MATCH OUTPUT ENABLE line is activated. When enabled, the MATCH output signals external circuitry that the CASC circuitry has detected a 20-bit match, and that the 6-bit address of the detecting channel can be read from the 6-bit input/output.

A daisy-chained DISABLE MATCH command passes through all sixty-four comparators 104A, 104B, 104C . . . The first comparator is always enabled. The next comparator will have its "match" output inhibited if the first comparator finds a match. If no match occurs in the first comparator, then the next comparator is enabled. Thus, if for some reason, two of the comparators were to find a match, only the lowest would have its output enabled. All higher numbered comparators would be inhibited. This assures that only one match will be signalled.

As noted above, each comparator's output controls the output buffer of a corresponding one of the 6-bit ROMs 106A, 106B, 106C, etc. The ROM stores the channel address. The ROM output to buffer 108 is TRI-STATED unless the comparator finds a match. Thus if the first channel finds that its 20-bit address stored in RAM matches the 20-bit input address, then its comparator enables the ROM output, providing the 6-bit channel address to the system external to the CASC circuitry. This applies to any channel up to the highest channel. Moreover, when any comparator detects a match, its output causes gate 109 to signal external circuitry of a CASC MATCH. Normally, the MATCH output is always enabled. Similarly, the 6-bit output is enabled except during CASC READ or WRITE. Likewise, the 20-bit output is disabled except during a READ.

Figure 3A:
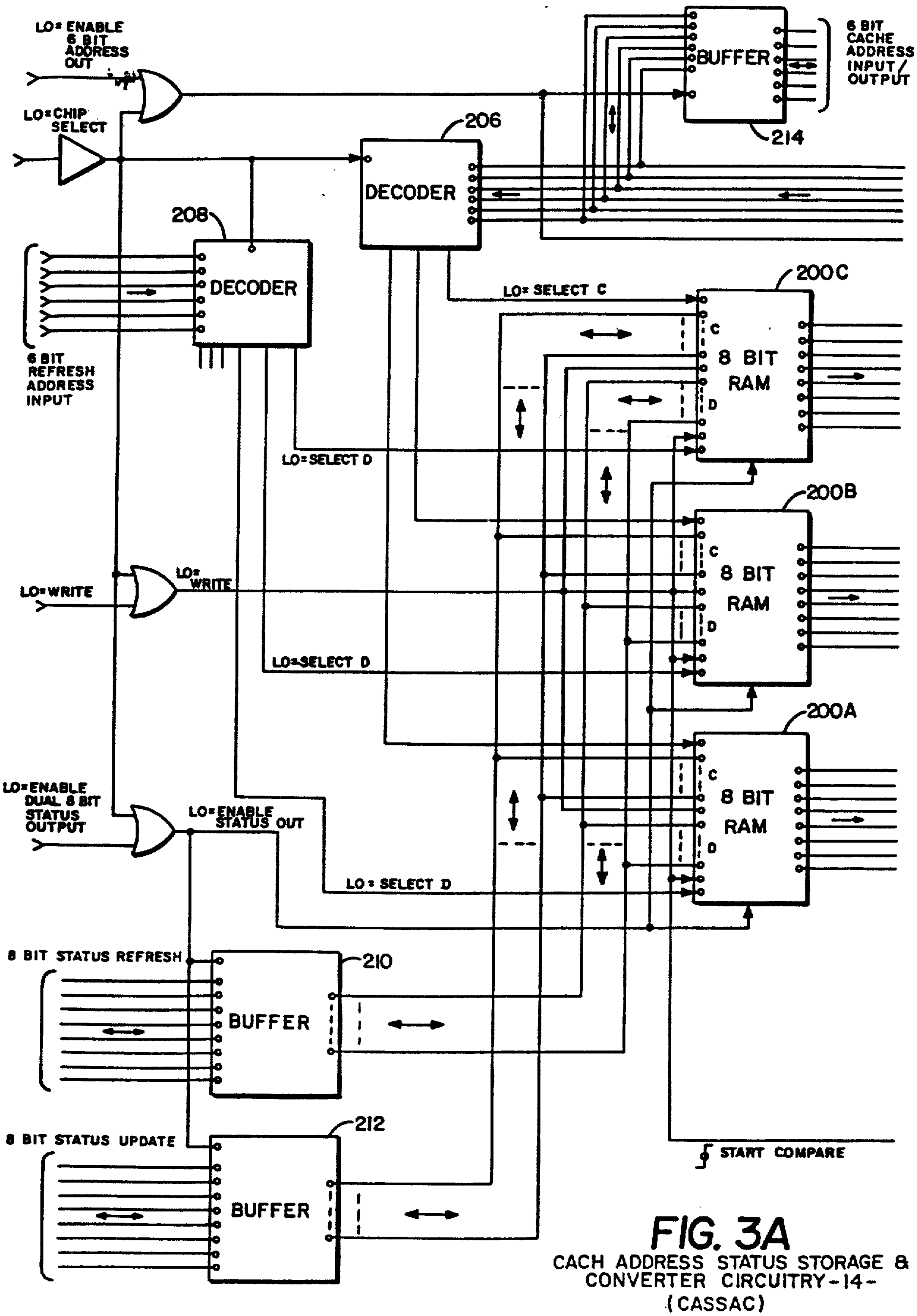
FIGS. 3A, 3B logic diagrams of another component of the system of FIG. 1, namely a cache address status storage and converter circuit (CASSAC)
Figure 3B:
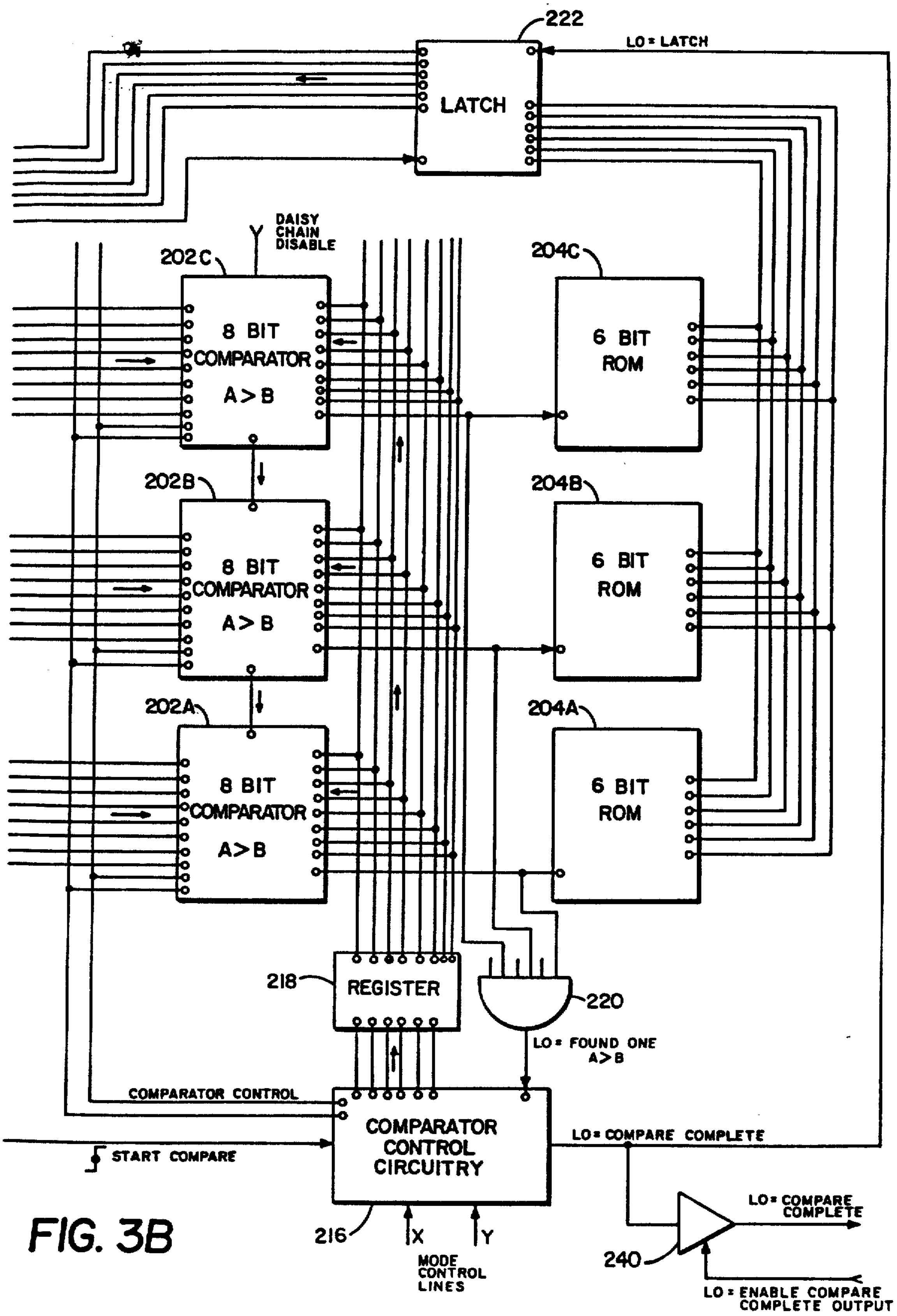

The cache address status storage and converter circuitry (CASSAC) 14 as shown in FIGS. 3A and 3B includes a number of 8-bit RAMs (FIG. 3A) such as designated 200A, 200B, 200C, etc., and a corresponding number of 8 bit comparators designated 202A, 202B, 202C, etc.; together with a corresponding number of 6-bit ROMs (FIG. 3B) designated 204A, 204B, 204C, etc. The circuitry also includes a decoder 206 and a decoder 208, together with buffers 210, 212 and 214. A comparator control circuit 216 is connected to a successive-approximation register 218 which in turn provides 8 bit signals to the comparators. An output gate 220 is connected to the comparator control circuitry 216. The system also includes a latch 222.

The CASSAC circuitry stores CACHE block status words by CACHE block addresses. The status words represent the history of each CACHE block while it is stored in CACHE, as related to reads, writes, numbers of accesses, etc. The circuit simultaneously compares all status words against each other to find the maximum number (greater than any other). Comparison is a standard successive-approximation process. The circuitry then converts the found, maximum status location into CACHE block address. The circuitry maintains a record of each CACHE block, so that when the CACHE memory is full, and a new block is to be moved into the CACHE memory, it can be determined, through the block status words, which block is to be over-written in the CACHE memory.

The circuitry of FIGS. 3A, 3B functions in a manner such that every time a block of main memory data is moved into the CACHE memory, a block status word is placed in one of the RAMs 200A, 200B, 200C . . . , at a location corresponding to the address of the corresponding block within the CACHE memory. For every successful access to the CACHE memory, the block status word corresponding to the block being accessed, is up-dated by circuitry external to the CASSAC circuit of FIG. 3 in accordance with a selected algorithm. Every status word within the CASSAC circuitry of FIGS. 3A, 3B is periodically up-dated in accordance with a selected algorithm, likewise by circuitry external to the CASSAC circuit.

The two algorithms referred to above must be mutually complementary so that the status is improved when a block is accessed, and the status is worsened by the refresh process. In this way, the blocks which are seldom accessed will have a poor status due to the refresh, while blocks which are frequently accessed will have a good status, in spite of refresh.

With all statuses stored in the CASSAC circuitry of FIGS. 3A, 3B and by the use of an individual comparator for each status, all statuses can be searched for the poorest rating, and the CACHE address of the reject block can be outputted from one of the ROMs 204A, 204B, 204C, etc. Since the location within the CACHE memory and in the CASSAC circuit of FIG. 3 are numerically the same, then the CASSAC output is merely the CASSAC channel number, that is, the RAM location number. Thus, the CASSAC ROMs 204A, 204B, 204C, etc. merely contain sequential numbers from zero to the maximum channel number.

The CASSAC circuit of FIGS. 3A, 3B, like the previous circuit may contain sixty-four identical channels, each containing an 8-bit static RAM, such as the RAMs 200A, 200B, 200C; an 8-bit greater-than comparator, such as the comparators 202A, 202B, 202C, etc.; and a 6-bit ROM, such as the ROMs 204A, 204B, 204C. Each ROM has an output buffer enabled by the output of the corresponding comparator. Each RAM has three outputs, one being introduced to the corresponding comparator, and the other two are TRI-STATED except when selected and enabled for output by one of the two 8-bit input/output channels.

In addition to the sixty-four identical RAM/COMPARATOR/ROM channels, the CASSAC circuitry contains the two 6-line to 64-line decoders 206 and 208. Each decoder selects one of sixty-four channels for READ/WRITE operations. Thus, two different 8-bit channels can be simultaneously read or written, since there are also two separate 8-bit status input/output buses to support the two decoders.

A write control line is buffered, and then taken to each of the sixty-four RAMs 200A, 200B, 200C . . . for WRITE operations. An output enable control is buffered and then taken to each of the sixty-four RAMs 200A, 200B, 200C . . . for READ operations. Any given RAM will not respond to either the WRITE command, or the OUTPUT ENABLE command, unless it is specifically selected by one of the two decoders 206, 208.

Two 6-bit addresses enter the CASSAC circuitry to control the two decoders 206, 208. Address #1 comes in directly from outside to decoder 208; whereas Address #2 can come from outside through the bidirectional buffer 214, or from latch 222 which contains the last comparator address output. Both decoders 206 and 208 are enabled by the CHIP SELECT input. If the CHIP SELECT line is inactive, then no RAM can be selected, nor can it be written to or read from.

The bidirectional buffer 214 (transceiver) for Address #2 input/output is controlled by two lines, which must both be active to enable an output to be derived from the latch 222. If either line is inactive, then Address #2 for decoder 206 is derived from circuits external to the CASSAC circuitry through buffer 214.

The comparator control logic consists of the successive-approximation register 218 (National Semiconductor DM2502 Integrated Circuit), and an oscillator for clocking the comparisons, and the 64-input/output gate 220 to collect the comparator results. Two mode control lines cause all sixty-four comparators to ignore 0, 1, 2 or 3 of the most significant bits. When a sequence of comparisons is completed, the COMPARE COMPLETE signal is transmitted from a tri-state buffer 240 to the external circuits, but only when the COMPARE COMPLETE OUTPUT ENABLE line is activated.

The CASSAC circuitry contains sixty-four channels in the illustrated embodiment. Each channel contains one of the 8-bit static RAMs 200A, 200B, 200C etc., and each channel also uses the three bidirectional buffers 210, 212 and 214.

Each of the buffers 210 and 212 are TRI-STATED unless a particular channel is selected by a 6-bit input address and the CHIP SELECT line is active, and also the dual 8-bit status output enable line is activated. When the buffers 210 and 212 are TRI-STATED, then 8-bit status data is available from the two 8-bit buses from buffers 210 and 212 for writing into the 8-bit RAMs 200A, 200B, 200C, etc. If a WRITE command is received, and if one of the two decoders 206 and 208 has selected a specific channel, then data associated with that particular channel is written into the RAM. If both buffers should be simultaneously selected to write into the same RAM, the RAM will only accept data from buffer 212, and will ignore data from buffer 210. This assures that status up-date occurs rather than status refresh, if they ever conflict.

If one of the decoders 206, 208 selects a RAM, and the status output line is activated, then the corresponding buffer 210 or 212 will be enabled to take the RAM data from the corresponding internal bus, and thence to the output status bus. If both decoders 206, 208 select the same RAM for output, both buffers 210 and 212 will be activated, placing identical data on each of the two buses for output.

Each of the 64 CASSAC channels contains one of the 8-bit comparators 202A, 202B, 202C, etc., which determines whether the RAM output is greater than the common input from the successive approximation register 218. Common control lines allow disabling of 0, 1, 2 or 3 of the most significant bits from entering into the comparison. Thus, the comparison may be an 8-bit compare, or 7-, 6- or 5-bit compare.

If a channel comparator finds that the RAM output is greater than the common input, then the comparator activates its MATCH INPUT which goes to the comparator control circuitry 64-input output gate 220, and also to a corresponding one of the ROMs 204A, 204B, 204C to cause the channel number to be output by the corresponding ROM after a compare complete, and thus the CACHE memory block address.

A daisy-chained ENABLE passes through all sixty-four of the comparators 202A, 202B, 202C, etc. The first comparator (address 0) is always enabled. The next comparator will have its "MATCH" output inhibited if the first comparator finds a "MATCH". Otherwise the next comparator is enabled. Therefore, if two comparators were to find a match, only the lower address comparator would have its output enabled, and all higher numbered comparators would be inhibited. This assures that after a small propagation delay, only one "MATCH" address is signalled.

The compare operation occurs simultaneously for all channels, and it takes eight steps to complete for an 8-bit compare. The first step is performed by setting the approximation register 218 to approximately one-half full scale 7F (HEX), and seeing whether any comparator finds a higher input. If so, the register is set to BF (HEX), otherwise to 3F (HEX). Then another comparison occurs to determine whether to set the next-to-most significant bit, and so on until the last comparison determines the least significant bit.

Once the comparison steps are complete, the register 218 contains the highest status contained in any of the sixty-four RAMs 200A, 200B, 200C . . . , and the single surviving comparator 202A, 202B, 202C . . . with a MATCH output enables its channel ROM 204A, 204B, 204C, to provide a 6-bit address to be latched for output to the CACHE memory block address. A final sequencing signal occurs after the eighth comparison and latches the output address, after all comparators have settled from the last comparison.

Figure 4:
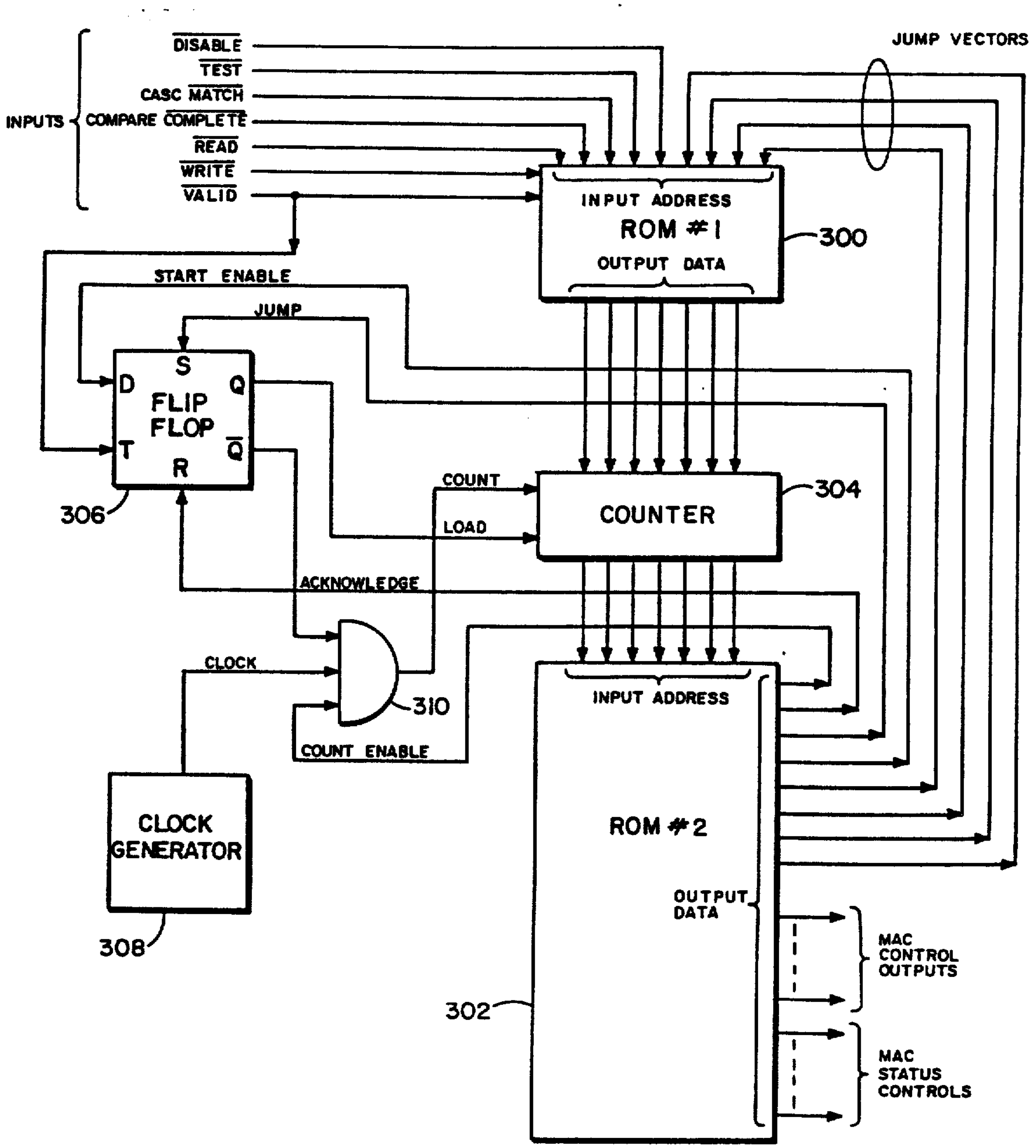
FIG. 4, is a logic diagram of a memory access cache control circuit (MAC), also included in the system of FIG. 1.
Figure 5:
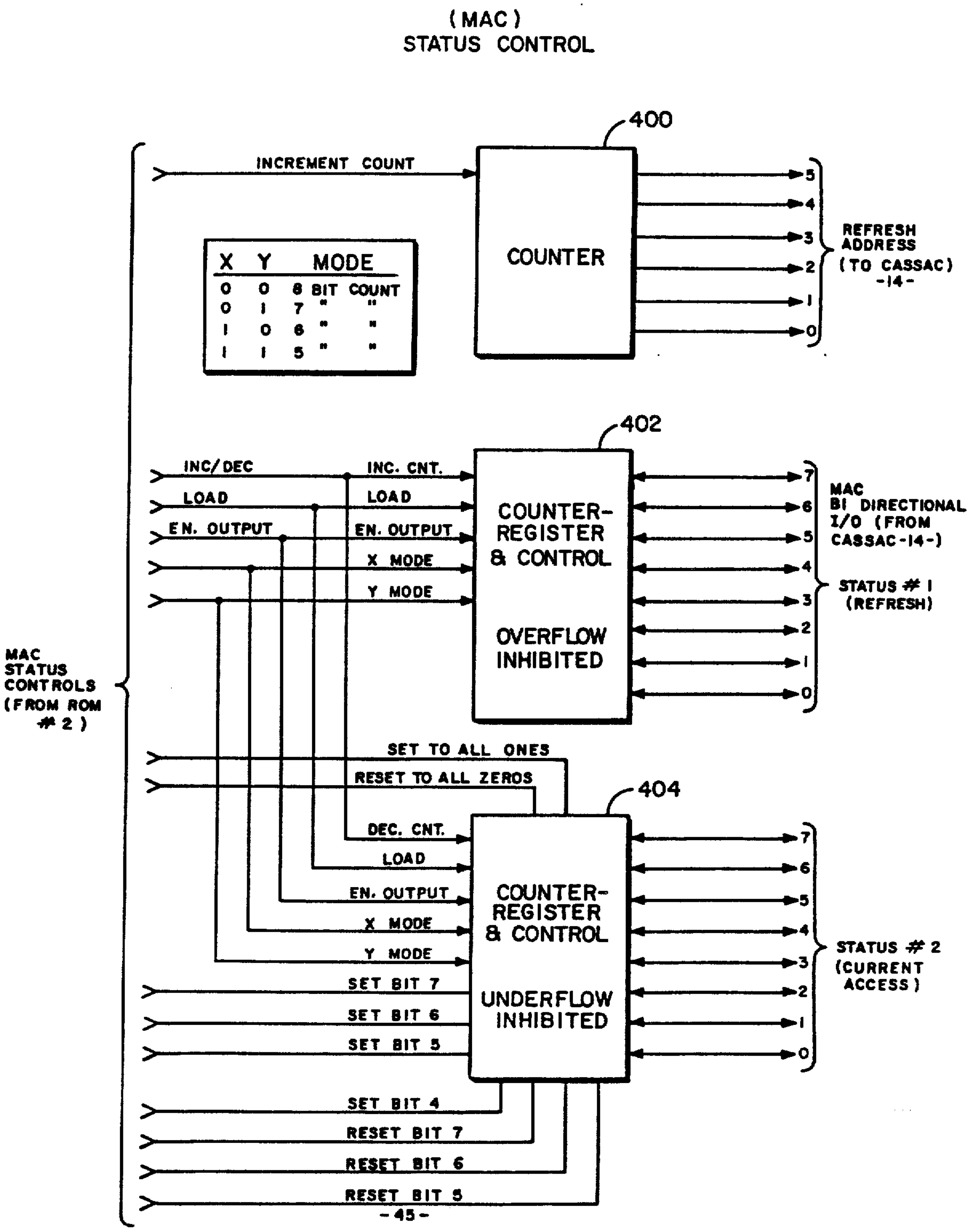
FIG. 5 is a logic diagram of further associated with the (MAC) control circuit of FIG. 4.

The memory access cache control circuitry (MAC) 10 is shown in more detail in FIGS. 4 and 5. The purpose of the MAC circuitry 10 is to provide the fastest possible access to the main memory 16 (FIG. 1) through the use of the cache memory 18, this being achieved by introducing appropriate control signals to the CASC circuitry 12 and to the CASSAC circuitry 14. The MAC circuitry provides overall main memory and cache memory access control signals as determined by the main memory and cache memory interactions.

The MAC circuitry of FIG. 4 includes a pair of ROMs 300, 302 designated ROM #1 and ROM #2; a counter 304; a flip-flop 306; a clock generator 308; and a gate 310. The MAC circuitry accepts primary access requests from the central processing unit 20 of FIG. 1, and in response to these requests generates control signals to direct the CASC circuitry 12 and CASSAC circuitry 14 to perform their control functions.

The MAC circuitry 10 directs all access requests to the cache memory 18, but if the addressed data is not in the cache memory, the MAC circuitry causes a block of data to be transferred by simultaneous parallel transfer from the main memory 16 to the cache memory 18, as explained above. The MAC circuitry uses the CASC circuitry to convert main memory addresses from the central processing unit to cache addresses, and to signal the WAIT command to the central processing unit if there is no block in the cache memory corresponding to a particular requested address.

The MAC circuitry uses the CASSAC circuitry 14 to maintain a status word in the CASSAC circuitry for each block in the cache memory, and to determine the least used or longest unused cache block address. Accordingly, when the cache memory is full, and when an address request from the central processing unit does not match any block stored in the cache memory, the addressed block is transferred from the main memory to the cache memory, as explained above, overwriting the least used or longest unused block in the cache memory, as determined by the CASSAC circuitry.

The main portion of the MAC circuitry, as shown in FIG. 4, consists of two fast ROMs 300 and 302, designated ROM #1 and ROM #2. The ROM #1 stores starting addresses, which can be selected by the MAC input signals and also by internal control signals. The outputs from ROM #1 are loaded into a fast counter 304, and this counter provides the input address for ROM #2. The MAC circuitry also includes a high frequency clock generator 308 which provides count pulses to increment counter 304, and thereby sequence the ROM #2. The outputs from ROM #2 are a number of control outputs, and also the internal control signals which are used by the MAC circuitry for sequencing and status purposes.

A typical sequence starts with inputs to ROM #1 in a static condition and with the counter 304 stopped. The ROM #2 controls CASC 12 to permit 20-bit input addresses to be converted and sent to the cache memory 18 for words already stored in the CACHE memory without operation of the MAC circuitry, so that the MAC circuitry does not delay primary action when the central processing unit addresses a word already stored in the cache memory.

Next, the inputs to the MAC circuitry which change to a different configuration, and a valid address signal, cause an output combination from ROM #1 to be loaded into the counter 304, thus providing a starting address for ROM #2. The outputs from ROM #2 now perform a control sequence as the counter is monotonically incremented by clock pulses from clock generator 308. The sequence stops when a step within the stored program in ROM #2 causes the counter to cease, restoring a static condition, to wait for the next sequence.

ROM #1 has two types of inputs. These are control inputs from the central processing unit, and responses from the CASC circuitry 12 and CASSAC circuitry 14; and jump vector control signals from ROM #2. ROM #1 has outputs which provide preset values to load into counter 304. The counter 304 has two control inputs, which are the incrementing clock pulses from clock generator 308, and the load signal from the flip-flop 306 which forces the counter to load in a preset value from ROM #1.

Flip-flop 306 is a D-type flip-flop which responds to set and reset input signals. Normally, the set and reset input signals are inactive, and the D input signal is active, and when the valid address signal goes active, its leading edge triggers the flip-flop, setting the Q output, and thus forcing counter 304 to load the starting address for ROM #2.

When ROM #2 receives a valid starting address from the counter 304, an acknowledge output from ROM #2 resets flip-flop 306. Another ROM #2 output, along with the now active $\overline{Q}$ flip-flop output, enables "and" gate 310 to send clock pulses to the counter 304 to step the counter through the stored program. Moreover, another ROM #2 output disables the D input to flip-flop 306 so that noise or other signals on the valid line will not disturb the stored program.

When ROM #2 reaches the final step in a stored program, it causes a jump to the standard idle program. A jump occurs as follows: (1) jump vectors specify address; (2) a jump command sets flip-flop 306, forcing the counter to stop counting and to load the starting address of the new stored program; (3) the first step in the new program resets flip-flop 306, enabling counting, so that the new stored program will now be executed.

The status idle stored program assures that flip-flop 306 is reset, disables the flip-flop set and reset inputs, disables "and" gate 310 to stop counting by counter 304, and waits for the next valid address signal to start the sequence again.

It should be noted that in the idle mode, when counting is disabled, and ROMs #1 and #2 are inactive, the outputs from ROM #2 are set in such a way as to cause the CASC circuitry 12 automatically to compare and convert incoming addresses to block addresses of cache memory 18 so that no delay occurs while starting up the MAC circuitry. When the MAC circuitry is then activated, if the CASC circuitry has been able to match the address to a block stored in the cache memory, and if it is a read request, then all that is required of the MAC circuitry is to introduce the cache word-read command, and access is granted, since the address is already converted by the CASC circuitry.

The status control portion of the MAC control circuitry is shown in FIG. 5. This status control circuit includes a 6-bit standard counter 400, and two complex counter-register circuits 402, 404. All control inputs to the three elements originate at ROM #2. The 6-bit refresh address, and the two 8-bit statuses are all connected to the CASSAC circuitry.

The 6-bit counter 400 is normally incremented once per standard primary sequence, to cause a new refresh address, so that a cache block status can be incremented. The two counter registers 402, 404 are normally loaded with status words from the CASSAC circuitry once per cycle, and the two status words are then up-dated and returned to the CASSAC circuitry. The load command fills the two registers with two specific status words. The increment/decrement command increments the status word #1 and decrements the status word #2. The X and Y mode commands control how many bits act as a counter. The possibility is eight, seven, six or five, corresponding to XY=00, 01, 10 or 11, as shown in the truth table. If XY=11, then the increment/decrement command only affects the least significant five bits of each status word, leaving the three more significant bits unchanged. The ENABLE OUTPUT command allows the up-dated status words to flow back to the CASSAC control circuitry.

The #1 refresh status word only gets its count portion incremented before being returned, and the other bits are never changed in the refresh status word. However, the #2 status word, which corresponds to the cache block presently being accessed, may change in several different ways. The #2 status word is originally set to a specific value, of which the counter portion is typically set to approximately one-half. Thus, suppose XY=10 is being used, giving a 6-bit count, the #2 status word is initially set to 100000 (binary) =32 (decimal), which is approximately one-half the maximum count of 111111 (binary) =63 (decimal). The two more significant bits are used as status flags, and each may be set or reset, depending upon circumstances.

Thus, controls are provided for each of the two more significant bits to be either set to "1" or reset to "0". The extreme case is for mode XY=11 where the count is 5-bits only, then bit 4 needs to be set for the initial count, and bits 5, 6 and 7 need be set or reset as flags. Therefore, comprehensive controls are provided to set all bits to "1" or all bits to "0", and also individual controls are provided for bits 4, 5, 6 and 7. Individual controls for bits 0, 1, 2 and 3 are never required, since these are either set all to zero or one as a group, except when counting.

The MAC control circuitry enters its primary mode of operation when the CPU addresses a word from memory, and that word is contained in the cache memory. The primary sequence of events is therefore as follows:

1. 26 address bits arrive from the CPU, with the low order 6-bits going directly to the cache memory, and with the high order 20-bits going to the CASC circuitry.

2. The READ command is introduced to the MAC circuitry from the CPU.

3. A valid address signal is introduced to the MAC circuitry from the CPU.

4. The CASC compares and converts the high order 20-bits of the address to the cache 6-bit address.

5. The CASC signals address MATCH to the MAC circuitry.

6. The MAC circuitry causes the cache word to be read.

7. The cache memory outputs to the CPU the addressed word.

During the primary sequence described above, a secondary sequence occurs simultaneously, to up-date the status of the block accesses. It should be noted that the following secondary sequence must start with step 5 of the primary and can finish any time prior to step 5 of a subsequent primary cycle. Thus, the secondary sequence overlaps the two primary cycles. This secondary sequence comprises reading two 8-bit status words from the CASSAC circuitry into the MAC circuitry, the No. 1 status word being addressed by the 6-bit REFRESH address, and the No. 2 status word being addressed by the 6-bit CACHE block address generated by the CASC circuitry in step 4 of the primary sequence.

Within the MAC circuitry the following operations occur:

(a) The least significant 6-bits of the status No. 1 word are incremented, but overflow is inhibited, that is, when a maximum count of all 1's is reached, no further counting is permitted.

(b) The least significant 6-bits of the status No. 2 word are decremented as a counter, but overflow is inhibited.

(c) The No. 6-bit of the No. 2 status word is set, and is used as a READ USED status command.

(d) The two up-dated status words from the MAC circuitry are transferred back into the CASSAC circuitry to the same addresses from which they originated.

(e) A new CASSAC comparison is started, in case the next sequence requires a determination of the least desired block in the cache memory.

(f) The 6-bit REFRESH address in the MAC circuitry is incremented and output to the CASSAC circuitry for the next cycle.

The control outputs from the ROM #2 of the MAC circuitry of FIG. 4 are as follows:

"WAIT" tells the CPU that memory is not ready, and a delay is required. Absence of a "WAIT" command indicates data is in CACHE and that a rapid access can proceed immediately.

"ADDRESS DISABLE" tri-states the incoming address buffer (except for that part which goes directly to CACHE, and not to main memory), so that a different address (from CASC) may be used.

"ADDRESS LATCH" causes the present address to be latched for main memory. This can be used for "WRITE-THROUGH", or "WRITE-BACK", or any process which proceeds independent of the memory access requestor.

"CACHE BLOCK READ" initiates a read from CACHE (to main memory).

"CACHE BLOCK WRITE" initiates a write to CACHE (from main memory).

"CACHE WORD READ" initiates a read from CACHE to the requestor (CPU, DMA, etc.). Note that this may involve a bit, a byte, three bytes, or whatever. The size of the access is controlled directly between the requestor and CACHE.

"CACHE WORD WRITE" initiates a write to CACHE from the requestor.

"MEMORY READ" initiates a block read from main memory. (Corresponds to "CACHE BLOCK WRITE").

"MEMORY WRITE" initiates a block write to main memory. (Corresponds to "CACHE BLOCK READ").

"CASC ADDRESS" enables the 6-bit block address to be placed on the CACHE ADDRESS bus by the CASC. Note that this address is converted from main memory address.

"ADDRESS ENABLE" causes the CASC to place on the main address bus, a 20-bit address converted from the 6-bit CACHE address. (Corresponds to "ADDRESS DISABLE").

"CASC WRITE" causes the CASC to store the present 20-bit address into a location corresponding to the present 6-bit address.

"CASC ENABLE" CASC select.

"CASSAC ENABLE" CASSAC select.

"CASSAC READ" causes the CASSAC to output two 8-bit statuses, corresponding to the two 6-bit addresses (CACHE ADDRESS bus and REFRESH ADDRESS).

"CASSAC WRITE" causes the CASSAC to accept and store two 8-bit statuses into locations corresponding to the two 6-bit addresses "CASSAC ADDRESS" enables the 6-bit CACHE block address to be placed on the bus by the CASSAC.

"COMPARE MODE X" one of two lines which select comparison mode of CASSAC. The four modes are 8-bits, 7, 6 and 5-bit comparison, corresponding to X, Y=00, 01, 10 and 11.

"COMPARE MODE Y" second mode control line.

"REFRESH ADDRESS" this is a 6-bit address similar to the 6-bit CACHE address bus, but which controls CASSAC status up-dates.

The bi-directional input/output of the counter register 402 of FIG. 5 designated "Status #1" comprise 8-bits of a memory block status word which is addressed by the 6-bit refresh address. The bi-directional input/output of the counter register 404 is the Status #2 8-bit memory block status word which is addressed by the 6-bit cache address bus.

The invention provides, therefore, a computer memory system which includes a relatively slow access main memory unit and a relatively fast access smaller cache memory unit, the memory units being controlled by a central processing unit, and which includes appropriate control circuitry such that all words addressed by the central processing unit are accessed when possible from the cache memory unit, and when an address word is not stored in the cache memory unit, that word, and a number of adjacent words are simultaneously transferred from the main memory to the cache memory to be readily available to the central processing unit.

APPENDIX

Computer Memory System Parts List

Listed below are integrated circuits which may be used in the blocks referred to above. The three major components of the system, namely the CASC, CASSAC, and MAC circuits will function most efficiently if each is incorporated within one or two new, custom integrated circuits (ICs). However, they can certainly be realized by many different combinations of presently available standard ICs.

The following table lists in numerical order, all of the blocks referenced in this specification. By each number a suggested group of ICs is listed which could realize the functions of the corresponding block. All ICs referenced herein can be purchased from Texas Instruments (TI) and can be found in "The Bipolar Microcomputer Components Data Book for Design Engineers", Third Edition, 1981 by TI, unless otherwise noted.

Note that in the 74SXX family, the S may be replaced by AS, LS, ALS, F, H, C, SC, and other possible designations of pin and function compatible to ICs. Any of these will probably work, however, the fastest available units are those specific ones which have been designated.

| REF | FUNCTION | INTEGRATED CIRCUITS |
|---|---|---|
| 10 | MAC | SEE BELOW |
| 12 | CASC | SEE BELOW |
| 14 | CASSAC | SEE BELOW |
| 16 | MAIN MEMORY | INTEL 2164 |
| 18 | CACHE | INTEL 2149H-2 |
| 20 | CPU | N/A |
| 22 | ADDRESS BUS | N/A |
| 24 | DATA BUS | N/A |
| 26 | BUFFER-26 | 4-74LS245 |
| 100 | 20 BIT RAM | 64X 3-74LS245, 3-74S374, 1-74AS832 |
| 102 | BUFFER-20 | 3-74LS245 |
| 104 | 20 BIT COMPARITOR | 64X 3-74LS686,1-74AS802 |
| 106 | 6 BIT ROM | 5-PP74AS840 |
| 108 | BUFFER-6 | 74LS245 |
| 109 | 64 INPUT NAND | 5-74S133,1-74AS802 |
| 110 | 6 TO 64 DECODER | 9-74S138 |
| 200 | 8 BIT RAM | 64X 2-74LS245, 1-74S374, 1-74AS832, 1-74AS808 |
| 202 | 8 BIT COMPARITOR | 64X 74LS686,74AS804 |
| 204 | 6 BIT ROM | SEE 106 |
| 206 | 6 TO 64 DECODER | SEE 110 |
| 208 | 6 TO 64 DECODER | SEE 110 |
| 210 | BUFFER-8 | SEE 108 |
| 212 | BUFFER-8 | SEE 108 |
| 214 | BUFFER-6 | SEE 108 |
| 216 | COMPARITOR CONTROL | 74S374;74AS867;74AS800,802,808,832 |
| 218 | SUCCESSIVE-APPROX REG | NATIONAL SEMICONDUCTOR DM2502 |

-continued

| REF | FUNCTION | INTEGRATED CIRCUITS |
|---|---|---|
| 220 | 64 INPUT NAND | SEE 109 |
| 222 | LATCH | 74S374 |
| 300 | ROM | SEE 106 |
| 302 | ROM | SEE 106 |
| 304 | COUNTER | 74AS867 |
| 306 | FLIPFLOP | 74S74 |
| 308 | CLOCK GENERATOR | VECTRON CO-239A-2S-0, 100 MHz |
| 310 | AND GATE-3 | 74AS808 |
| 400 | COUNTER-6 | SEE 304 |
| 402 | COUNTER-REGISTER | 74AS867;74S374;74AS800,802,808,832 |
| 404 | COUNTER-REGISTER | SEE 402 |

It will be appreciated that while a particular embodiment of the control system of the invention has been shown and described, modifications may be made, and it is intended in the following claims to cover all such modifications which come within the true spirit and scope of the invention.

I claim:

1. In combination a central processor and a computer memory system, said computer memory system including: a relatively slow access relatively large main memory; a relatively fast access relatively small auxiliary memory; a plurality of parallel transfer lines intercoupling said main memory and said auxiliary memory; first control circuitry coupled to the central processor and to the main and auxiliary memories for accessing the auxiliary memory for all words addressed by the central processor which are stored in the auxiliary memory, and for accessing the main memory when a particular addressed work cannot be found in the auxiliary memory, said first control circuitry including storage means for storing the main memory address of all words presently stored in said auxiliary memory, comparator means for simultaneously comparing a desired main memory address received from the central processor against all the main memory addresses stored in said storage means, logic circuitry coupled to said comparator means for converting the desired main memory address into the corresponding auxiliary memory address if a match is made by said comparator means and for accessing the addressed work in said auxiliary memory, and further logic circuitry connected to said comparator means for effectively transferring the particular addressed word and a predetermined number of adjacent words from the main memory to the auxiliary memory along said parallel transfer lines when no match is made by said comparator means.

2. The combination defined in claim 1, and which includes second control circuitry connected to said auxiliary memory and including second storage means for storing status words representing on a continuous bases the frequency by which groups of words are stored in said auxiliary memory, the second circuit means connected to said second storage means for selecting a group of words in the auxiliary memory to be deleted in accordance with a predetermined status evaluation of all groups of words in the auxiliary memory when the aforesaid group of words is transferred from the main memory to the auxiliary memory and the auxiliary memory is already full.

3. The combination defined in claim 1, in which said first control circuitry includes circuit means coupled to said comparator means for introducing a WAIT signal to the central processor when no match is made by said comparator means so as to interrupt the operation of the central processor until the addressed word is available to be accessed in the auxiliary memory.

4. The combination defined in claim 1, in which said comparator means includes a plurality of comparators for providing for parallel instantaneous conversion of the main memory address into the corresponding auxiliary memory address when a match is made.

5. The combination defined in claim 2, in which said second control circuitry includes means connected to said second storage means for simultaneously comparing all of the status words in said second storage means with one another to determine which group of words in the auxiliary memory is to be deleted by the next group of words transferred from the main memory.

6. The combination defined in claim 5, in which said second control circuitry includes further circuit means for updating each of said status words in said second storage means when a word in a group of words in the auxiliary memory has been accessed.

* * * * *